US011949145B2

(12) United States Patent
Yao et al.

(10) Patent No.: US 11,949,145 B2
(45) Date of Patent: Apr. 2, 2024

(54) TRANSITION FORMED OF LTCC MATERIAL AND HAVING STUBS THAT MATCH INPUT IMPEDANCES BETWEEN A SINGLE-ENDED PORT AND DIFFERENTIAL PORTS

(71) Applicant: Aptiv Technologies AG, Schaffhausen (CH)

(72) Inventors: Jun Yao, Noblesville, IN (US); Roberto Leonardi, Nuremberg (DE); Dennis C. Nohns, Kokomo, IN (US); Ryan K. Rossiter, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/164,790

(22) Filed: Feb. 6, 2023

(65) Prior Publication Data

US 2023/0187804 A1 Jun. 15, 2023

Related U.S. Application Data

(63) Continuation of application No. 17/392,984, filed on Aug. 3, 2021, now Pat. No. 11,616,282.

(51) Int. Cl.
*H01P 5/10* (2006.01)
*H01P 3/12* (2006.01)
*H01P 5/04* (2006.01)

(52) U.S. Cl.
CPC ................ *H01P 5/10* (2013.01); *H01P 3/121* (2013.01); *H01P 5/04* (2013.01)

(58) Field of Classification Search
CPC ................................ H01P 5/10; H01P 5/1022
(Continued)

(56) References Cited

U.S. PATENT DOCUMENTS 2,851,686 A 9/1958 Hagaman
3,029,432 A 4/1962 Hansen
(Continued)

FOREIGN PATENT DOCUMENTS

CA 2654470 A1 12/2007
CN 1254446 A 5/2000
(Continued)

OTHER PUBLICATIONS

"Extended European Search Report", EP Application No. 18153137.7, dated Jun. 15, 2018, 8 pages.
(Continued)

*Primary Examiner* — Benny T Lee
(74) *Attorney, Agent, or Firm* — Harness, Dickey & Pierce, P.L.C.

(57) ABSTRACT

This document describes techniques, apparatuses, and systems utilizing a high-isolation transition design for differential signal ports. A differential input transition structure includes a first layer and a second layer made of a conductive metal and a substrate positioned between the first and second layers. The second layer includes a first section that electrically connects to a single-ended signal contact point and to a first contact point of a differential signal port. The first section includes a first stub based on an input impedance of the single-ended signal contact point and a second stub based on a differential input impedance associated with the differential signal port. The second layer includes a second section that electrically connects to a second contact point of the differential signal port and to the first layer through a via housed in a pad. The second section includes a third stub associated with the differential input impedance.

20 Claims, 4 Drawing Sheets

(58) Field of Classification Search
USPC .......................................................... 333/26
See application file for complete search history.

(56) References Cited

U.S. PATENT DOCUMENTS

| | | | |
|---|---|---|---|
| 3,032,762 | A | 5/1962 | Kerr |
| 3,328,800 | A | 6/1967 | Algeo |
| 3,462,713 | A | 8/1969 | Knerr |
| 3,473,162 | A | 10/1969 | Veith |
| 3,579,149 | A | 5/1971 | Ramsey |
| 3,594,806 | A | 7/1971 | Black et al. |
| 3,597,710 | A | 8/1971 | Levy |
| 3,852,689 | A | 12/1974 | Watson |
| 4,157,516 | A | 6/1979 | Grijp |
| 4,291,312 | A | 9/1981 | Kaloi |
| 4,453,142 | A | 6/1984 | Murphy |
| 4,562,416 | A | 12/1985 | Sedivec |
| 4,590,480 | A | 5/1986 | Nikolayuk et al. |
| 4,839,663 | A | 6/1989 | Kurtz |
| 5,030,965 | A | 7/1991 | Park et al. |
| 5,047,738 | A | 9/1991 | Wong et al. |
| 5,065,123 | A | 11/1991 | Heckaman et al. |
| 5,068,670 | A | 11/1991 | Maoz |
| 5,113,197 | A | 5/1992 | Luh |
| 5,337,065 | A | 8/1994 | Bonnet et al. |
| 5,350,499 | A | 9/1994 | Shibaike et al. |
| 5,541,612 | A | 7/1996 | Josefsson |
| 5,638,079 | A | 6/1997 | Kastner et al. |
| 5,923,225 | A | 7/1999 | Santos |
| 5,926,147 | A | 7/1999 | Sehm et al. |
| 5,982,256 | A | 11/1999 | Uchimura et al. |
| 5,986,527 | A | 11/1999 | Ishikawa et al. |
| 6,072,375 | A | 6/2000 | Adkins et al. |
| 6,166,701 | A | 12/2000 | Park et al. |
| 6,414,573 | B1 | 7/2002 | Swineford et al. |
| 6,489,855 | B1 | 12/2002 | Kitamori et al. |
| 6,535,083 | B1 | 3/2003 | Hageman et al. |
| 6,622,370 | B1 | 9/2003 | Sherman et al. |
| 6,788,918 | B2 | 9/2004 | Saitoh et al. |
| 6,794,950 | B2 | 9/2004 | Toit et al. |
| 6,859,114 | B2 | 2/2005 | Eleftheriades et al. |
| 6,867,660 | B2 | 3/2005 | Kitamori et al. |
| 6,958,662 | B1 | 10/2005 | Salmela et al. |
| 6,992,541 | B2 | 1/2006 | Wright et al. |
| 7,002,511 | B1 | 2/2006 | Ammar et al. |
| 7,091,919 | B2 | 8/2006 | Bannon |
| 7,142,165 | B2 | 11/2006 | Sanchez et al. |
| 7,420,442 | B1 | 9/2008 | Forman |
| 7,439,822 | B2 | 10/2008 | Shimura et al. |
| 7,495,532 | B2 | 2/2009 | McKinzie, III |
| 7,498,994 | B2 | 3/2009 | Vacanti |
| 7,626,476 | B2 | 12/2009 | Kim et al. |
| 7,659,799 | B2 | 2/2010 | Jun et al. |
| 7,886,434 | B1 | 2/2011 | Forman |
| 7,973,616 | B2 | 7/2011 | Shijo et al. |
| 7,994,879 | B2 | 8/2011 | Kim et al. |
| 8,013,694 | B2 | 9/2011 | Hiramatsu et al. |
| 8,089,327 | B2 | 1/2012 | Margomenos et al. |
| 8,159,316 | B2 | 4/2012 | Miyazato et al. |
| 8,395,552 | B2 | 3/2013 | Geiler et al. |
| 8,451,175 | B2 | 5/2013 | Gummalla et al. |
| 8,451,189 | B1 | 5/2013 | Fluhler |
| 8,576,023 | B1 | 11/2013 | Buckley et al. |
| 8,604,990 | B1 | 12/2013 | Chen et al. |
| 8,692,731 | B2 | 4/2014 | Lee et al. |
| 8,717,124 | B2 | 5/2014 | Vanhille et al. |
| 8,803,638 | B2 | 8/2014 | Kildal |
| 8,948,562 | B2 | 2/2015 | Norris et al. |
| 9,007,269 | B2 | 4/2015 | Lee et al. |
| 9,203,139 | B2 | 12/2015 | Zhu et al. |
| 9,203,155 | B2 | 12/2015 | Choi et al. |
| 9,246,204 | B1 | 1/2016 | Kabakian |
| 9,258,884 | B2 | 2/2016 | Saito |
| 9,356,238 | B2 | 5/2016 | Norris et al. |
| 9,368,878 | B2 | 6/2016 | Chen et al. |
| 9,450,281 | B2 | 9/2016 | Kim |
| 9,537,212 | B2 | 1/2017 | Rosen et al. |
| 9,647,313 | B2 | 5/2017 | Marconi et al. |
| 9,653,773 | B2 | 5/2017 | Ferrari et al. |
| 9,653,819 | B1 | 5/2017 | Izadian |
| 9,673,532 | B2 | 6/2017 | Cheng et al. |
| 9,806,393 | B2 | 10/2017 | Kildal et al. |
| 9,806,431 | B1 | 10/2017 | Izadian |
| 9,813,042 | B2 | 11/2017 | Xue et al. |
| 9,843,301 | B1 | 12/2017 | Rodgers et al. |
| 9,882,288 | B2 | 1/2018 | Black et al. |
| 9,935,065 | B1 | 4/2018 | Baheti et al. |
| 9,991,606 | B2 | 6/2018 | Kirino et al. |
| 9,997,842 | B2 | 6/2018 | Kirino et al. |
| 10,027,032 | B2 | 7/2018 | Kirino et al. |
| 10,042,045 | B2 | 8/2018 | Kirino et al. |
| 10,090,600 | B2 | 10/2018 | Kirino et al. |
| 10,114,067 | B2 | 10/2018 | Lam et al. |
| 10,153,533 | B2 | 12/2018 | Kirino |
| 10,158,158 | B2 | 12/2018 | Kirino et al. |
| 10,164,318 | B2 | 12/2018 | Seok et al. |
| 10,164,344 | B2 | 12/2018 | Kirino et al. |
| 10,186,787 | B1 | 1/2019 | Wang et al. |
| 10,218,078 | B2 | 2/2019 | Kirino et al. |
| 10,230,173 | B2 | 3/2019 | Kirino et al. |
| 10,263,310 | B2 | 4/2019 | Kildal et al. |
| 10,283,832 | B1 | 5/2019 | Chayat et al. |
| 10,312,596 | B2 | 6/2019 | Gregoire |
| 10,315,578 | B2 | 6/2019 | Kim et al. |
| 10,320,083 | B2 | 6/2019 | Kirino et al. |
| 10,333,227 | B2 | 6/2019 | Kirino et al. |
| 10,374,323 | B2 | 8/2019 | Kamo et al. |
| 10,381,317 | B2 | 8/2019 | Maaskant et al. |
| 10,381,741 | B2 | 8/2019 | Kirino et al. |
| 10,439,298 | B2 | 10/2019 | Kirino et al. |
| 10,468,736 | B2 | 11/2019 | Mangaiahgari |
| 10,505,282 | B2 | 12/2019 | Lilja |
| 10,534,061 | B2 | 1/2020 | Vassilev et al. |
| 10,559,889 | B2 | 2/2020 | Kirino et al. |
| 10,594,045 | B2 | 3/2020 | Kirino et al. |
| 10,601,144 | B2 | 3/2020 | Kamo et al. |
| 10,608,345 | B2 | 3/2020 | Kirino et al. |
| 10,613,216 | B2 | 4/2020 | Vacanti et al. |
| 10,622,696 | B2 | 4/2020 | Kamo et al. |
| 10,627,502 | B2 | 4/2020 | Kirino et al. |
| 10,649,461 | B2 | 5/2020 | Han et al. |
| 10,651,138 | B2 | 5/2020 | Kirino et al. |
| 10,651,567 | B2 | 5/2020 | Kamo et al. |
| 10,658,760 | B2 | 5/2020 | Kamo et al. |
| 10,670,810 | B2 | 6/2020 | Sakr et al. |
| 10,705,294 | B2 | 7/2020 | Guerber et al. |
| 10,707,584 | B2 | 7/2020 | Kirino et al. |
| 10,714,802 | B2 | 7/2020 | Kirino et al. |
| 10,727,561 | B2 | 7/2020 | Kirino et al. |
| 10,727,611 | B2 | 7/2020 | Kirino et al. |
| 10,763,590 | B2 | 9/2020 | Kirino et al. |
| 10,763,591 | B2 | 9/2020 | Kirino et al. |
| 10,775,573 | B1 | 9/2020 | Hsu et al. |
| 10,811,373 | B2 | 10/2020 | Zaman et al. |
| 10,826,147 | B2 | 11/2020 | Sikina et al. |
| 10,833,382 | B2 | 11/2020 | Sysouphat |
| 10,833,385 | B2 | 11/2020 | Mangaiahgari |
| 10,892,536 | B2 | 1/2021 | Fan et al. |
| 10,944,184 | B2 | 3/2021 | Shi et al. |
| 10,957,971 | B2 | 3/2021 | Doyle et al. |
| 10,957,988 | B2 | 3/2021 | Kirino et al. |
| 10,962,628 | B1 | 3/2021 | Laifenfeld et al. |
| 10,971,824 | B2 | 4/2021 | Baumgartner et al. |
| 10,983,194 | B1 | 4/2021 | Patel et al. |
| 10,985,434 | B2 | 4/2021 | Wagner et al. |
| 10,992,056 | B2 | 4/2021 | Kamo et al. |
| 11,061,110 | B2 | 7/2021 | Kamo et al. |
| 11,088,432 | B2 | 8/2021 | Seok et al. |
| 11,088,464 | B2 | 8/2021 | Sato et al. |
| 11,114,733 | B2 | 9/2021 | Doyle et al. |
| 11,121,441 | B1 | 9/2021 | Rmili et al. |
| 11,121,475 | B2 | 9/2021 | Yang et al. |
| 11,169,325 | B2 | 11/2021 | Guerber et al. |
| 11,171,399 | B2 | 11/2021 | Alexanian et al. |

(56) References Cited

U.S. PATENT DOCUMENTS 11,196,171 B2 12/2021 Doyle et al.
11,201,414 B2 12/2021 Doyle et al.
11,249,011 B2 2/2022 Challener
11,283,162 B2 3/2022 Doyle et al.
11,289,787 B2 3/2022 Yang
11,349,183 B2 5/2022 Rahiminejad et al.
11,349,220 B2 5/2022 Alexanian et al.
11,378,683 B2 7/2022 Alexanian et al.
11,411,292 B2 8/2022 Kirino
11,444,364 B2 9/2022 Shi
11,495,871 B2 11/2022 Vosoogh et al.
11,563,259 B2 1/2023 Alexanian et al.
11,611,138 B2 3/2023 Ogawa et al.
11,616,282 B2 * 3/2023 Yao et al. ............... H01P 3/121 333/135
11,626,652 B2 4/2023 Vilenskiy et al.
2002/0021197 A1 2/2002 Elco
2003/0052828 A1 3/2003 Scherzer et al.
2004/0041663 A1 3/2004 Uchimura et al.
2004/0069984 A1 4/2004 Estes et al.
2004/0090290 A1 5/2004 Teshirogi et al.
2004/0174315 A1 9/2004 Miyata
2005/0146474 A1 7/2005 Bannon
2005/0237253 A1 10/2005 Kuo et al.
2006/0038724 A1 2/2006 Tikhov et al.
2006/0113598 A1 6/2006 Chen et al.
2006/0158382 A1 7/2006 Nagai
2007/0013598 A1 1/2007 Artis et al.
2007/0054064 A1 3/2007 Ohmi et al.
2007/0103381 A1 5/2007 Upton
2008/0129409 A1 6/2008 Nagaishi et al.
2008/0150821 A1 6/2008 Koch et al.
2009/0040132 A1 2/2009 Sridhar et al.
2009/0207090 A1 8/2009 Pettus et al.
2009/0243762 A1 10/2009 Chen et al.
2009/0243766 A1 10/2009 Miyagawa et al.
2009/0300901 A1 12/2009 Artis et al.
2010/0134376 A1 6/2010 Margomenos et al.
2010/0321265 A1 12/2010 Yamaguchi et al.
2011/0181482 A1 7/2011 Adams et al.
2012/0013421 A1 1/2012 Hayata
2012/0050125 A1 3/2012 Leiba et al.
2012/0056776 A1 3/2012 Shijo et al.
2012/0068316 A1 3/2012 Ligander
2012/0163811 A1 6/2012 Doany et al.
2012/0194399 A1 8/2012 Bily et al.
2012/0242421 A1 9/2012 Robin et al.
2012/0256796 A1 10/2012 Leiba
2012/0280770 A1 11/2012 Abhari et al.
2013/0057358 A1 3/2013 Anthony et al.
2013/0082801 A1 4/2013 Rofougaran et al.
2013/0300602 A1 11/2013 Zhou et al.
2014/0015709 A1 1/2014 Shijo et al.
2014/0091884 A1 4/2014 Flatters
2014/0106684 A1 4/2014 Burns et al.
2014/0327491 A1 11/2014 Kim et al.
2015/0097633 A1 4/2015 Devries et al.
2015/0229017 A1 8/2015 Suzuki et al.
2015/0229027 A1 8/2015 Sonozaki et al.
2015/0263429 A1 9/2015 Vahidpour et al.
2015/0333726 A1 11/2015 Xue et al.
2015/0357698 A1 12/2015 Kushta
2015/0364804 A1 12/2015 Tong et al.
2015/0364830 A1 12/2015 Tong et al.
2016/0043455 A1 2/2016 Seler et al.
2016/0049714 A1 2/2016 Ligander et al.
2016/0056541 A1 2/2016 Tageman et al.
2016/0118705 A1 4/2016 Tang et al.
2016/0126637 A1 5/2016 Jemichi
2016/0195612 A1 7/2016 Shi
2016/0204495 A1 7/2016 Takeda et al.
2016/0211582 A1 7/2016 Saraf
2016/0276727 A1 9/2016 Dang et al.
2016/0293557 A1 10/2016 Topak et al.
2016/0301125 A1 10/2016 Kim et al.
2017/0003377 A1 1/2017 Menge
2017/0012335 A1 1/2017 Boutayeb
2017/0084554 A1 3/2017 Dogiamis et al.
2017/0288313 A1 10/2017 Chung et al.
2017/0294719 A1 10/2017 Tatomir
2017/0324135 A1 11/2017 Blech et al.
2018/0013208 A1 1/2018 Zadian et al.
2018/0032822 A1 2/2018 Frank et al.
2018/0123245 A1 5/2018 Toda et al.
2018/0131084 A1 5/2018 Park et al.
2018/0212324 A1 7/2018 Tatomir
2018/0226709 A1 8/2018 Mangaiahgari
2018/0233465 A1 8/2018 Spella et al.
2018/0254563 A1 9/2018 Sonozaki et al.
2018/0284186 A1 10/2018 Chadha et al.
2018/0301819 A1 10/2018 Kirino et al.
2018/0301820 A1 10/2018 Bregman et al.
2018/0343711 A1 11/2018 Wixforth et al.
2018/0351261 A1 12/2018 Kamo et al.
2018/0375185 A1 12/2018 Kirino et al.
2019/0006743 A1 1/2019 Kirino et al.
2019/0013563 A1 1/2019 Takeda et al.
2019/0057945 A1 2/2019 Maaskant et al.
2019/0109361 A1 4/2019 Ichinose et al.
2019/0115644 A1 4/2019 Wang et al.
2019/0187247 A1 6/2019 Izadian et al.
2019/0245276 A1 8/2019 Li et al.
2019/0252778 A1 8/2019 Duan
2019/0260137 A1 8/2019 Watanabe et al.
2019/0324134 A1 10/2019 Cattle
2020/0021001 A1 1/2020 Mangaiahgari
2020/0044360 A1 2/2020 Kamo et al.
2020/0059002 A1 2/2020 Renard et al.
2020/0064483 A1 2/2020 Li et al.
2020/0076086 A1 3/2020 Cheng et al.
2020/0106171 A1 4/2020 Shepeleva et al.
2020/0112077 A1 4/2020 Kamo et al.
2020/0166637 A1 5/2020 Hess et al.
2020/0203849 A1 6/2020 Lim et al.
2020/0212594 A1 7/2020 Kirino et al.
2020/0235453 A1 7/2020 Lang
2020/0284907 A1 9/2020 Gupta et al.
2020/0287293 A1 9/2020 Shi et al.
2020/0319293 A1 10/2020 Kuriyama et al.
2020/0343612 A1 10/2020 Shi
2020/0346581 A1 11/2020 Lawson et al.
2020/0373678 A1 11/2020 Park et al.
2021/0028528 A1 1/2021 Alexanian et al.
2021/0036393 A1 2/2021 Mangaiahgari
2021/0104818 A1 4/2021 Li et al.
2021/0110217 A1 4/2021 Gunel
2021/0159577 A1 5/2021 Carlred et al.
2021/0218154 A1 7/2021 Shi et al.
2021/0242581 A1 8/2021 Rossiter et al.
2021/0249777 A1 8/2021 Alexanian et al.
2021/0305667 A1 9/2021 Bencivenni
2022/0094071 A1 3/2022 Doyle et al.
2022/0109246 A1 4/2022 Emanuelsson et al.
2022/0196794 A1 6/2022 Foroozesh et al.

FOREIGN PATENT DOCUMENTS

CN 1620738 A 5/2005
CN 2796131 7/2006
CN 101584080 A 11/2009
CN 201383535 1/2010
CN 201868568 U 6/2011
CN 102157787 A 8/2011
CN 102420352 A 4/2012
CN 103326125 A 9/2013
CN 203277633 U 11/2013
CN 103490168 A 1/2014
CN 103515682 A 1/2014
CN 102142593 B 6/2014
CN 104101867 A 10/2014
CN 104900956 A 9/2015
CN 104993254 A 10/2015
CN 105071019 A 11/2015
CN 105609909 A 5/2016

(56) References Cited

FOREIGN PATENT DOCUMENTS

| | | | |
|---|---|---|---|
| CN | 105680133 | A | 6/2016 |
| CN | 105958167 | A | 9/2016 |
| CN | 107317075 | A | 11/2017 |
| CN | 108258392 | A | 7/2018 |
| CN | 109286081 | A | 1/2019 |
| CN | 109643856 | A | 4/2019 |
| CN | 109980361 | A | 7/2019 |
| CN | 110085990 | A | 8/2019 |
| CN | 209389219 | U | 9/2019 |
| CN | 110401022 | A | 11/2019 |
| CN | 111123210 | A | 5/2020 |
| CN | 111480090 | A | 7/2020 |
| CN | 108376821 | B | 10/2020 |
| CN | 110474137 | B | 11/2020 |
| CN | 109326863 | B | 12/2020 |
| CN | 112241007 | A | 1/2021 |
| CN | 212604823 | U | 2/2021 |
| CN | 112986951 | A | 6/2021 |
| CN | 112290182 | B | 7/2021 |
| CN | 113193323 | B | 10/2021 |
| CN | 214706247 | U | 11/2021 |
| DE | 112017006415 | | 9/2019 |
| DE | 102019200893 | A1 | 7/2020 |
| EP | 0174579 | A2 | 3/1986 |
| EP | 0818058 | A1 | 1/1998 |
| EP | 2267841 | A1 | 12/2010 |
| EP | 2500978 | A1 | 9/2012 |
| EP | 2843758 | A1 | 3/2015 |
| EP | 2766224 | B1 | 12/2018 |
| EP | 3460903 | A1 | 3/2019 |
| EP | 3785995 | A1 | 3/2021 |
| EP | 3862773 | A1 | 8/2021 |
| EP | 4089840 | A1 | 11/2022 |
| GB | 893008 | A | 4/1962 |
| GB | 2463711 | A | 3/2010 |
| GB | 2489950 | A | 10/2012 |
| JP | 2000183222 | A | 6/2000 |
| JP | 2003198242 | A | 7/2003 |
| JP | 2003289201 | A | 10/2003 |
| JP | 5269902 | B2 | 8/2013 |
| JP | 2013187752 | A | 9/2013 |
| JP | 2015216533 | A | 12/2015 |
| KR | 20080044752 | A | 5/2008 |
| KR | 1020080044752 | A | 5/2008 |
| KR | 20080105396 | A | 12/2008 |
| KR | 101092846 | B1 | 12/2011 |
| KR | 102154338 | B1 | 9/2020 |
| WO | 9934477 | A1 | 7/1999 |
| WO | 2013189513 | A1 | 12/2013 |
| WO | 2018003932 | A1 | 1/2018 |
| WO | 2018052335 | A1 | 3/2018 |
| WO | 2019085368 | A1 | 5/2019 |
| WO | 2020082363 | A1 | 4/2020 |
| WO | 2021072380 | A1 | 4/2021 |
| WO | 2022122319 | A1 | 6/2022 |
| WO | 2022225804 | A1 | 10/2022 |

OTHER PUBLICATIONS

"Extended European Search Report", EP Application No. 20155296.5, dated Jul. 13, 2020, 12 pages.

"Extended European Search Report", EP Application No. 20166797, dated Sep. 16, 2020, 11 pages.

"Extended European Search Report", EP Application No. 21211165.2, dated May 13, 2022, 12 pages.

"Extended European Search Report", EP Application No. 21211167.8, dated May 19, 2022, 10 pages.

"Extended European Search Report", EP Application No. 21211168.6, dated May 13, 2022, 11 pages.

"Extended European Search Report", EP Application No. 21211452.4, dated May 16, 2022, 10 pages.

"Extended European Search Report", EP Application No. 21211474.8, dated Apr. 20, 2022, 14 pages.

"Extended European Search Report", EP Application No. 21211478.9, dated May 19, 2022, 10 pages.

"Extended European Search Report", EP Application No. 21212703.9, dated May 3, 2022, 13 pages.

"Extended European Search Report", EP Application No. 21215901.6, dated Jun. 9, 2022, 8 pages.

"Extended European Search Report", EP Application No. 21216319.0, dated Jun. 10, 2022, 12 pages.

"Extended European Search Report", EP Application No. 22160898.7, dated Aug. 4, 2022, 11 pages.

"Extended European Search Report", EP Application No. 22166998.9, dated Sep. 9, 2022, 12 pages.

"Extended European Search Report", EP Application No. 22183888.1, dated Dec. 20, 2022, 10 pages.

"Extended European Search Report", EP Application No. 22183892.3, dated Dec. 2, 2022, 8 pages.

"Foreign Office Action", CN Application No. 201810122408.4, dated Jun. 2, 2021, 15 pages.

"Foreign Office Action", CN Application No. 201810122408.4, dated Oct. 18, 2021, 19 pages.

"Foreign Office Action", CN Application No. 202010146513.9, dated Feb. 7, 2022, 14 pages.

"WR-90 Waveguides", Pasternack Enterprises, Inc., 2016, Retrieved from https://web.archive.org/web/20160308205114/http://www.pasternack.com:80/wr-90-waveguides-category.aspx, 2 pages.

Adams, et al., "Dual Band Frequency Scanned, Height Finder Antenna", 1991 21st European Microwave Conference, 1991, 6 pages.

Alhuwaimel, et al., "Performance Enhancement of a Slotted Waveguide Antenna by Utilizing Parasitic Elements", Sep. 7, 2015, pp. 1303-1306.

Furtula, et al., "Waveguide Bandpass Filters for Millimeter-Wave Radiometers", Journal of Infrared, Millimeter and Terahertz Waves, 2013, 9 pages.

Gray, et al., "Carbon Fibre Reinforced Plastic Slotted Waveguide Antenna", Proceedings of Asia-Pacific Microwave Conference 2010, pp. 307-310.

Hausman, "Termination Insensitive Mixers", 2011 IEEE International Conference on Microwaves, Communications, Antennas and Electronic Systems (COMCAS 2011), Nov. 7, 2011, 13 pages.

Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.

Jankovic, et al., "Stepped Bend Substrate Integrated Waveguide to Rectangular Waveguide Transitions", Jun. 2016, 2 pages.

Li, et al., "Millimetre-wave slotted array antenna based on double-layer substrate integrated waveguide", Jun. 1, 2015, pp. 882-888.

Lin, et al., "A THz Waveguide Bandpass Filter Design Using an Artificial Neural Network", Micromachines 13(6), May 2022, 11 pages.

Mak, et al., "A Magnetoelectric Dipole Leaky-Wave Antenna for Millimeter-Wave Application", Dec. 12, 2017, pp. 6395-6402.

Mallahzadeh, et al., "A Low Cross-Polarization Slotted Ridged SIW Array Antenna Design With Mutual Coupling Considerations", Jul. 17, 2015, pp. 4324-4333.

Ogiwara, et al., "2-D MoM Analysis of the Choke Structure for Isolation Improvement between Two Waveguide Slot Array Antennas", Proceedings of Asia-Pacific Microwave Conference 2007, 4 pages.

Razmhosseini, et al., "Parasitic Slot Elements for Bandwidth Enhancement of Slotted Waveguide Antennas", 2019 IEEE 90th Vehicular Technology Conference, Sep. 2019, 5 pages.

Rossello, et al., "Substrate Integrated Waveguide Aperture Coupled Patch Antenna Array for 24 GHz Wireless Backhaul and Radar Applications", Nov. 16, 2014, 2 pages.

Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.

Serrano, et al., "Lowpass Filter Design for Space Applications in Waveguide Technology Using Alternative Topologies", Jan. 2013, 117 pages.

(56) References Cited

OTHER PUBLICATIONS

Shehab, et al., "Substrate-Integrated-Waveguide Power Dividers", Oct. 15, 2019, pp. 27-38.
Wang, et al., "Low-loss frequency scanning planar array with hybrid feeding structure for low-altitude detection radar", Sep. 13, 2019, pp. 6708-6711.
Wang, et al., "Mechanical and Dielectric Strength of Laminated Epoxy Dielectric Graded Materials", Mar. 2020, 15 pages.
Wu, et al., "A Planar W-Band Large-Scale High-Gain Substrate-Integrated Waveguide Slot Array", Feb. 3, 2020, pp. 6429-6434.
Xu, et al., "CPW Center-Fed Single-Layer SIW Slot Antenna Array for Automotive Radars", Jun. 12, 2014, pp. 4528-4536.
Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.
"Extended European Search Report", EP Application No. 22184924.3, dated Dec. 2, 2022, 13 pages.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Giese, et al., "Compact Wideband Single-ended and Differential Microstrip-to-waveguide Transitions at W-band", Jul. 2015, 4 pages.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wu, et al., "The Substrate Integrated Circuits—A New Concept for High-Frequency Electronics and Optoelectronics", Dec. 2003, 8 pages.
Yuasa, et al., "A millimeter wave wideband differential line to waveguide transition using short ended slot line", Oct. 2014, pp. 1004-1007.
"Extended European Search Report", EP Application No. 23158037.4, dated Aug. 17, 2023, 9 pages.
"Extended European Search Report", EP Application No. 23158947.4, dated Aug. 17, 2023, 11 pages.
"Foreign Office Action", CN Application No. 202111550163.3, dated Jun. 17, 2023, 25 pages.
"Foreign Office Action", CN Application No. 202111550448.7, dated Jun. 17, 2023, 19 pages.
"Foreign Office Action", CN Application No. 202111551711.4, dated Jun. 17, 2023, 29 pages.
"Foreign Office Action", CN Application No. 202111551878.0, dated Jun. 15, 2023, 20 pages.
"Foreign Office Action", CN Application No. 202111563233.9, dated May 31, 2023, 15 pages.
"Foreign Office Action", CN Application No. 202111652507.1, dated Jun. 26, 2023, 14 pages.
"Foreign Office Action", CN Application No. 202210251362.2, dated Jun. 28, 2023, 15 pages.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Hausman, et al., "Termination Insensitive Mixers", 2011 IEEE International Conference on Microwaves, Communications, Antennas and Electronic Systems (COMCAS 2011), Dec. 19, 2011, 13 pages.
Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.

* cited by examiner

TRANSITION FORMED OF LTCC MATERIAL AND HAVING STUBS THAT MATCH INPUT IMPEDANCES BETWEEN A SINGLE-ENDED PORT AND DIFFERENTIAL PORTS

CROSS-REFERENCE TO RELATED APPLICATION

This application is a continuation of U.S. Pat. No. 11,616,282 B2, issued Mar. 28, 2023, the disclosure of which is hereby incorporated by reference in its entirety herein.

BACKGROUND

Some devices use electromagnetic signals (e.g., radar) to detect and track objects. For example, many devices include a Monolithic Microwave Integrated Circuit (MMIC) on a printed circuit board (PCB) for analog signal processing of microwave and/or radar signals, such as power amplification, mixing, and so forth. Substrate Integrated Waveguides (SIWs) provide a low-cost and production-friendly mechanism for routing the microwave and/or radar signals between the MMIC and antenna. However, connecting an MMIC signal port to an SIW poses challenges. To illustrate, an MMIC oftentimes includes differential signal ports for receiving and/or transmitting signals, while SIWs propagate single-ended signals. To conserve space on the PCB, the differential signal ports of the MMIC may be located close together, which may lead to RF power leakage between channels and signal degradation. Shielding structures further compound this problem by reflecting radiated signals back towards a source, causing further signal degradation that adversely impacts detection/tracking accuracy and a field of view of the radar signals.

SUMMARY OF THE INVENTION

This document describes techniques, apparatuses, and systems utilizing a high-isolation transition design for differential signal ports. In aspects, a differential input transition structure includes a first layer made of a conductive metal positioned at a bottom of the differential input transition structure. The differential input transition structure also includes a substrate above (and adjacent to) the first layer and a second layer made of the conductive metal, where the differential input transition structure positions the second layer above and adjacent to the substrate. The second layer of the differential input transition structure includes a first section formed to electrically connect a substrate integrated waveguide (SIW) to a first contact point of a differential signal port, the first section including a first stub based on an input impedance of the SIW and a second stub based on a differential input impedance associated with the differential signal port. The second layer of the differential input transition structure also includes a second section separated from the first section, where the second section is formed to electrically connect to a second contact point of the differential signal port and electrically connect to the first layer through a via. The second section includes a third stub associated with the differential input impedance and a pad that electrically connects the via to the second layer.

This Summary introduces simplified concepts related to a high-isolation transition design for differential signal ports, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of techniques, apparatuses, and systems utilizing a high-isolation transition design for differential signal ports are described in this document with reference to the following figures. The same numbers are often used throughout the drawings and the detail description to reference like features and components.

DETAILED DESCRIPTION OF THE INVENTION

Overview

Figure 1:
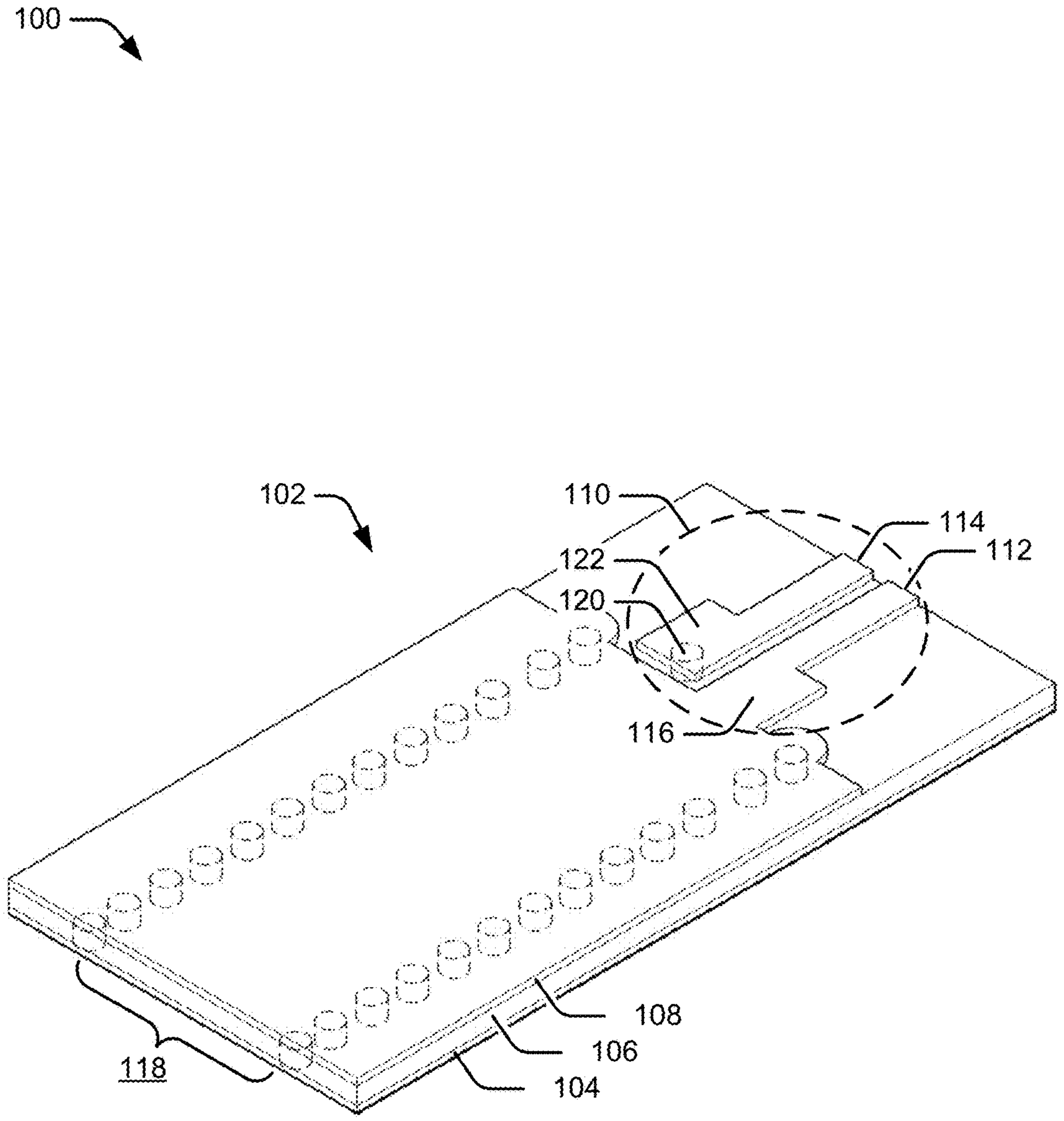
FIG. 1 illustrates an example system that includes a differential input transition structure, in accordance with techniques, apparatuses, and systems of this disclosure.

Many industries use radar systems as sensing technology, including the automotive industry, to acquire information about the surrounding environment. Some radar systems include one or more Monolithic Microwave Integrated Circuits (MMICs) on a printed circuit board (PCB) for processing microwave and/or radar signals. To illustrate, an antenna receives an over-the-air radar signal, which is then routed through a substrate integrated waveguide (SIW) to a receiver port of the MMIC for processing, such as mixing that down-converts a received signal to an intermediate frequency (IF) signal, power amplification that amplifies a transmit signal, and so forth. Thus, the SIW routes signals between the antenna and an MMIC signal port.

Connecting an MMIC signal port to an SIW poses challenges. To illustrate, an MMIC oftentimes implements the signal ports as differential signal ports, while SIWs propagate single-ended signals. Generally, a differential signal corresponds to a differential pair of signals, where signal processing focuses on the electrical difference between the pair of signals instead of a single signal and a ground plane. Conversely, a single-ended signal corresponds to a single signal referenced to the ground plane. Transition structures connect a differential signal to a single-ended signal and/or vice versa. As one example, a transition structure connects the MMIC differential signal port to the single-ended SIW signal port. Alternatively or additionally, other examples include, by way of example and not of limitation, an air waveguide feeding a differential antenna (e.g., for cellular communications), low-voltage differential signaling systems (LVDS), high-voltage differential (HVD) signaling systems, audio systems, display devices, and so forth.

When utilized on a PCB, many factors affect how well the transition structure performs. To illustrate, a PCB oftentimes has limited space, which results in compact designs. MMICs that include multiple differential signal ports may position the differential signal ports close together. Poor isolation between the differential signal ports, and the transition structures connecting the differential signal ports to SIWs, may result in RF power leakage between the different signals and degrade signal quality. Shielding structures further compound this problem by reflecting (leaked) radiated signals back towards a source, causing further signal degradation that adversely impacts detection/tracking accuracy and a field of view of the radar signals. Placing an MMIC and an antenna on opposite sides of a PCB also introduces challenges. Vertical transition structures used to route the signals through the PCB may cause unwanted radio frequency (RF) power loss. Further, the vertical transition structure designs utilize multiple PCB layers (e.g., greater than two), which increases a cost as more layers are added to the vertical transition structure.

This document describes techniques, apparatuses, and systems utilizing a high-isolation transition design for differential signal ports, also referred to as a "differential input transition structure." In aspects, a first layer of conductive metal, a second layer of the conductive metal, and a substrate positioned between the first layer and the second layer form a two-layer, horizontal differential input transition structure that provides high-isolation between channels and mitigates RF leakage that degrades signal quality. The two-layer, horizontal differential input transition structure also accommodates PCB configurations that place an MMIC and antenna on a same side, thus mitigating unwanted RF power loss. Using two layers relative to multiple PCB layers (e.g., greater than two) also helps reduce production costs. In other aspects, the differential input transition structure may be implemented using a single layer of a low-temperature co-fired ceramic (LTCC) material that feeds electromagnetic signals into other LTCC structures (e.g., an antenna, laminated waveguide).

As one example of a differential input transition structure, the second layer of the two-layer, horizontal differential input transition structure includes a first section formed to electrically connect a SIW to a first contact point of a differential signal port, where the first section includes (i) a first stub based on an input impedance of the SIW, and (ii) a second stub based on a differential input impedance associated with the differential signal port. The second layer of the two-layer, horizontal differential input transition structure also includes a second section formed to electrically connect to a second contact point of the differential signal port and electrically connect to the first layer through a via. In aspects, the second section includes a third stub associated with the differential input impedance and a pad that electrically connects the via to the second layer. This is just one example of the described techniques, apparatuses, and systems of a high-isolation transition design for differential signal ports. This document describes other examples and implementations.

Example System

FIG. 1 illustrates an example system 100 that includes a differential input transition structure in accordance with techniques, apparatuses, and systems of this disclosure. The system includes a device 102 formed using a first layer 104, a substrate 106, and a second layer 108. The system uses, as the first layer 104 and the second layer 108, a conductive material and/or metal, which may include one or more of copper, gold, silver, tin, nickel, metallic compounds, conductive ink, or the like. In some aspects, the first layer of conductive material (e.g., layer 104) includes a ground plane. The substrate 106 includes dielectric material, such as a laminate (e.g., Rogers RO3003), germanium, silicon, silicon dioxide, aluminum oxide, and so forth.

The system 100 includes a two-layer, horizontal differential input transition structure 110 (differential input transition structure 110) constructed from the first layer 104, the substrate 106, and the second layer 108. To illustrate, the differential input transition structure forms a first section 112 and a second section 114 using the second layer 108. The first section includes a stub 116 that has a size and/or shape based on impedance characteristics of a contact point, illustrated here as a substrate integrated waveguide 118 (SIWs). For example, a shape, size, and/or form of the SIW 118 (e.g., number of vias included, spacing between vias) may be based on an operating frequency and/or frequency range of signals being routed by the SIW. In turn, this may impact a shape and/or size of the stub 116. In aspects, the differential input transition structure 110 places the stub 116 at an entrance of the SIW 118. The second section 114 electrically connects the second layer 108 to the first layer 104 using a via 120 and a pad 122. Because the via 120 connects to both the second layer 108 and the first layer 104, and assuming the first layer 104 includes the ground plane, the via 120 routes the signal to the ground plane, which forces a 180° phase shift in the signal and allows a transition between a single-ended signal and a differential signal. In other words, introducing the 180° phase shift allows the differential signals to be summed together at a common point. The differential input transition structure 110 also separates the second section 114, or the pad 122, from the SIW 118 such that the pad 122 is (electrically) disconnected and separated from the SIW 118. The portion of the second layer that forms the second section of the differential input transition structure 110 and/or the pad does not physically touch the portion of the second layer that forms part of the SIW 118.

Figure 2:
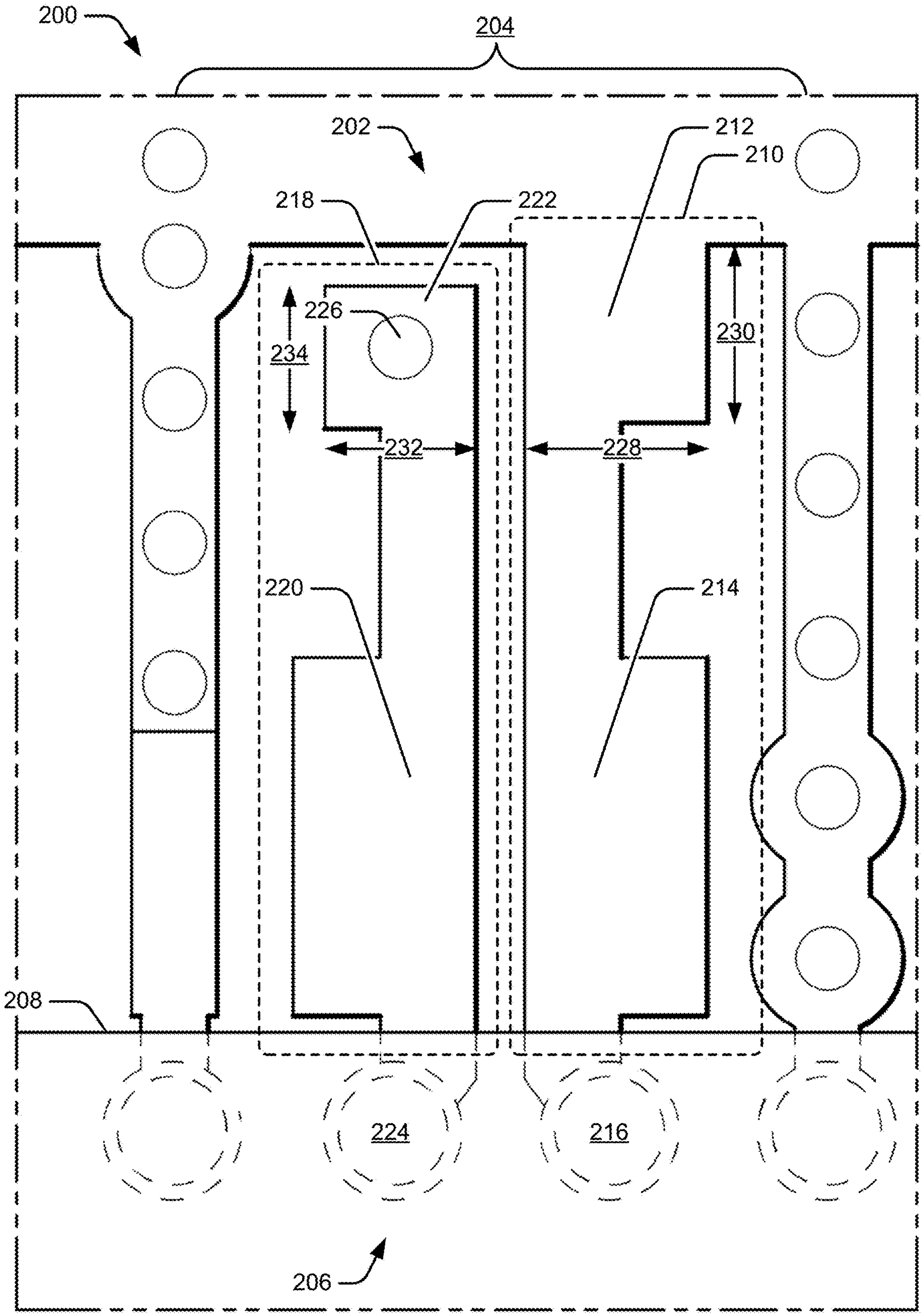
FIG. 2 illustrates an example system that includes a differential input transition structure, in accordance with techniques, apparatuses, and systems of this disclosure.

FIG. 2 illustrates a topical view of an example system 200 that includes a differential input transition structure 202 implemented using aspects of high-isolation transition design for differential signal ports. Some aspects implement the differential input transition structure 202 using techniques described with respect to the two-layer, horizontal differential input transition structure 110 of FIG. 1. In the system 200, a first end of the differential input transition structure 202 connects to a SIW 204, and a second end of the differential input transition structure 202 connects to a differential signal port 206 of an MMIC 208. In other words, the differential input transition structure 202 connects and routes signals between the SIW 204 and the MMIC 208 using the differential signal port 206.

A first section 210 of the differential input transition structure (e.g., formed using a second layer of a PCB) includes a first stub 212 placed at an entrance of the SIW 204 and a second stub 214 that connects to a first signal ball 216 of the differential signal port 206. A second section 218 of the differential input transition structure 202 (e.g., also formed using the second layer of the PCB) includes a third stub 220 and a pad 222. The third stub 220 connects to a second signal ball 224 of the differential signal port 206, while the pad 222 electrically connects the second layer of the PCB to a first layer of the PCB (not shown) using a via 226. The first signal ball 216 and the second signal ball 224 are illustrated in the FIG. 2 using dashed lines to denote these connections are within and/or are part of the MMIC 208. Similar to that described with reference to FIG. 1, the pad 222 and the SIW 204 are disconnected from one another.

The size and/or shape of the first stub 212 may be based on a combination of factors. To illustrate, the first stub 212 has a rectangular shape with a width 228 and a height 230 based on an input impedance of the SIW 204. Alternatively or additionally, the size and/or shape of the first stub 212 may be based on a material of the substrate (e.g., substrate 106 in FIG. 1) used to form the differential input transition structure 202, a dielectric property of the substrate, an operating frequency of signals transitioning through the differential input transition structure 202 (e.g., operating frequency of the differential signal port 206 and/or the SIW 204), a combined thickness of the first layer, the substrate, and the second layer used to form the differential input transition structure 202, and so forth. As one example, the width 228 generally has a length of 0.42 millimeters (mm), and the height 230 generally has a length of 0.43 mm. The term "generally" denotes that real-world implementations may deviate above or below absolute and exact values within a threshold value of error. To illustrate, the width 228 may be 0.42 mm within a threshold value of error, and the height 230 may be 0.43 mm within the threshold value of error.

In aspects, the size and/or shape of the pad 222 may be based on a size and/or shape of the via 226. For example, in the system 200, the pad 222 has a rectangular shape with a width 232 and a height 234, where the width 232 generally has a length of 0.35 millimeters (mm) and the height 234 generally has a length of 0.35 mm, each within a threshold value of error. In some aspects, the threshold value of error corresponds to a percentage of error, such as 0.1% error, 0.5% error, 1% error, 5% error, and so forth.

The size and shape of the second stub 214 and/or the third stub 220 may alternatively or additionally be based on any combination of an input impedance of the differential signal port 206, a substrate material, a dielectric property of the substrate, a thickness of a PCB used to implement the differential input transition structure 202, an operating frequency of the differential input transition structure 202, the SIW 204, and/or the differential signal port 206, and so forth. Some aspects determine the size and/or shape of the second stub 214 and the third stub 220 jointly. In other words, the size and/or shape of the second stub 214 and the third stub 220 depend on one another. As one example, the size and/or shape of the second stub 214 and the third stub 220 are based on jointly forming a quarter-wave impedance transformer for a microwave and/or radar signal transmitted and/or received by the MMIC 208 through the signal balls 216 and 224. Example frequency ranges include the millimeter band defined as 40-100 Gigahertz (GHz), the Ka band defined as 25.5-40 GHz, the K band defined as 18-26.6 GHz, and the Ku band defined as 12.5-18 GHz.

Figure 3:
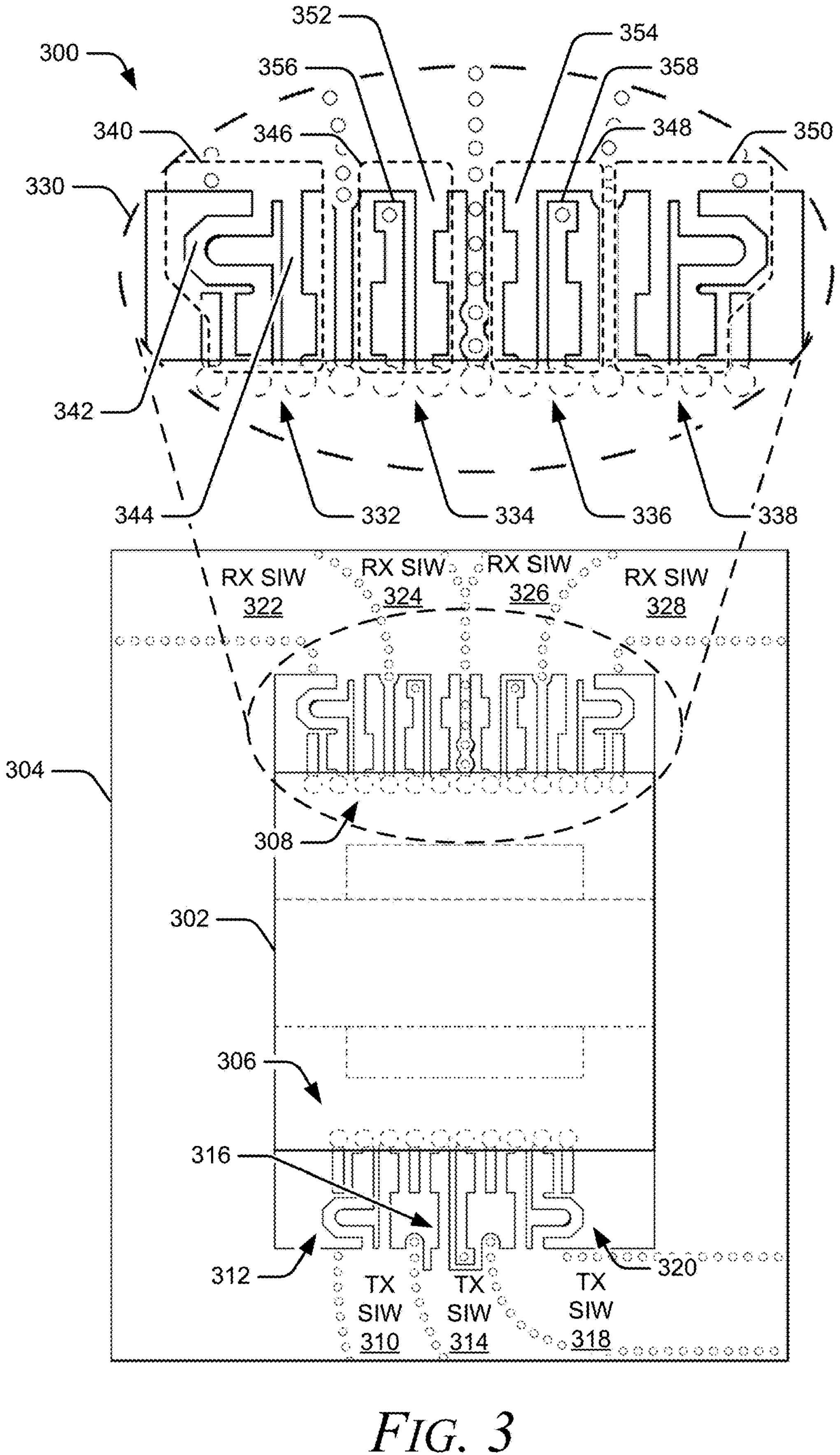
FIG. 3 illustrates an example printed circuit board (PCB) that includes an MMIC, one or more substrate integrated waveguides (SIWs), and one or more differential input transition structures, in accordance with techniques, apparatuses, and systems of this disclosure.

FIG. 3 illustrates a topical view of an example system 300 that includes differential input transition structures, in accordance with techniques, apparatuses, and systems of this disclosure. The example system 300 includes an MMIC 302 embedded on a PCB 304 with multiple differential signal ports: three transmit differential signal ports 306 and four receive differential signal ports 308. Each differential signal port of the MMIC 302 connects to a respective SIW using either a balun-with-delay structure or a differential input transition structure. As further described below, the combination and placement of the differential input transition structure and the balun-with-delay structures help improve isolation between the transmit and/or receive channels.

Transmit substrate integrated waveguide 310 (TX SIW 310) connects to a first balun-with-delay structure 312, transmit substrate integrated waveguide 314 (TX SIW 314) connects to a first differential input transition structure 316, and transmit substrate integrated waveguide 318 (TX SIW 318) connects to a second balun-with-delay structure 320. The first balun-with-delay structure 312, the first differential input transition structure 316, and the second balun-with-delay structure 320 each connect to a respective transmit differential signal ball pair of the transmit differential signal ports 306. In a similar manner, receive substrate integrated waveguide 322 (RX SIW 322), receive substrate integrated waveguide 324 (RX SIW 324), receive substrate integrated waveguide 326 (RX SIW 326), and receive substrate integrated waveguide 328 (RX SIW 328) each connect to a respective receive differential signal ball pair of the receive differential signal ports 308 using, respectively, either a balun-with-delay structure or a differential input transition structure. Each connection to a SIW (e.g., a receive SIW, a transmit SIW), whether using a differential input transition structure or a balun-with-delay structure, corresponds to a single-ended signal connection. Similarly, each connection to a differential signal port, whether using a differential input transition structure or a balun-with-delay structure, corresponds to a differential signal connection.

The combination and placement of the differential input transition structures and the balun-with-delay-structures help to improve isolation between the signal channels. As one example, the combination shown in image 330 places structures with different radiation patterns next to one another to reduce RF coupling. The image 330 represents an enlarged view of receive-side functionality included in the system 300. The receive differential signal ports 308 are individually labeled as receive differential signal port 332, receive differential signal port 334, receive differential signal port 336, and receive differential signal port 338. These connections are shown as dashed lines to denote the signal ports are within and/or are part of the MMIC 302. While the image 330 illustrates receive-side functionality, the various aspects described may alternatively or additionally pertain to transmit-side functionality.

A third balun-with-delay structure 340 of the system 300 connects to the RX SIW 322 and the receive differential signal port 332 using a first section 342 and a second section 344. The first section 342 includes a delay line that introduces a 180° phase shift in a signal carried by the first section and a stub (e.g., an impedance-matching stub), while the second section 344 includes a stub. The 180° phase shift allows the differential signals to be summed together at a common point. The system 300 also positions a second differential input transition structure 346 next to the balun-with-delay-structure 340. In some aspects, the second differential input transition structure 346 corresponds to the differential input transition structure 202 of FIG. 2. The differential input transition structure 346 connects to the RX SIW 324 and the receive differential signal ports 334. Because the balun-with-delay structure 340 has a different radiation pattern than the second differential input transition structure 346, positioning the two structures next to one another reduces coupling between signals propagating with the radiation patterns and helps improve channel isolation, reduces RF leakage between the channels, and improves signal quality. This also improves a detection accuracy calculated from analyzing the signals. While described with reference to receive-side functionality, this positioning alternatively or additionally reduces transmit-side couplings between signals as shown by the placement of the first balun-with-delay structure 312, the first differential input transition structure 316, and the second balun-with-delay structure 320.

On the receive side, a third differential input transition structure 348 and a fourth balun-with-delay structure 350 mirror the positioning of the second differential input transition structure 346 and the third balun-with-delay structure 340. The third differential input transition structure 348 connects to the RX SIW 326 and the receive differential signal ports 336, while the fourth balun-with-delay structure 350 connects to the RX SIW 328 and the receive differential signal ports 338. Because the second differential input transition structure 346 and the third differential input transition structure 348 are located next to one another, mirroring or flipping the section locations from one another helps improve channel isolation and reduce RF leakage between the channels. To illustrate, because the second differential input transition structure 346 and the third differential input transition structure 348 have similar radiation patterns, flipping and/or mirroring the section placement helps separate the propagation of the radiation patterns and reduces RF leakage. The isolation between the second differential input transition structure 346 and the third differential input transition structure 348 may be proportional to a distance between the respective vias of each differential input transition structure (e.g., further distance improves isolation). Thus, the system 300 positions a first section 352 of the differential input transition structure 346 next to a first section 354 of the differential input transition structure 348. This positions a second section 356 of the differential input transition structure 346 and a second section 358 of the differential input transition structure 348, the second section 356 and the second section 358 each housing a respective via, away from each other instead of next to each other (e.g., like the first sections) and further improves the isolation between channels.

While the example 300 shows a combination of differential input transition structure and balun-with-delay structure, alternate implementations may only use differential input transition structures. For example, with reference to the image 330, some implementations may replace the balun-with-delay structure 340 with a differential input transition structure (whose section placement may mirror the sections of the differential input transition structure 346) and/or the balun-with-delay structure 350 with a differential input transition structure (whose section placement may mirror the sections of the differential input transition structure 348).

Figure 4:
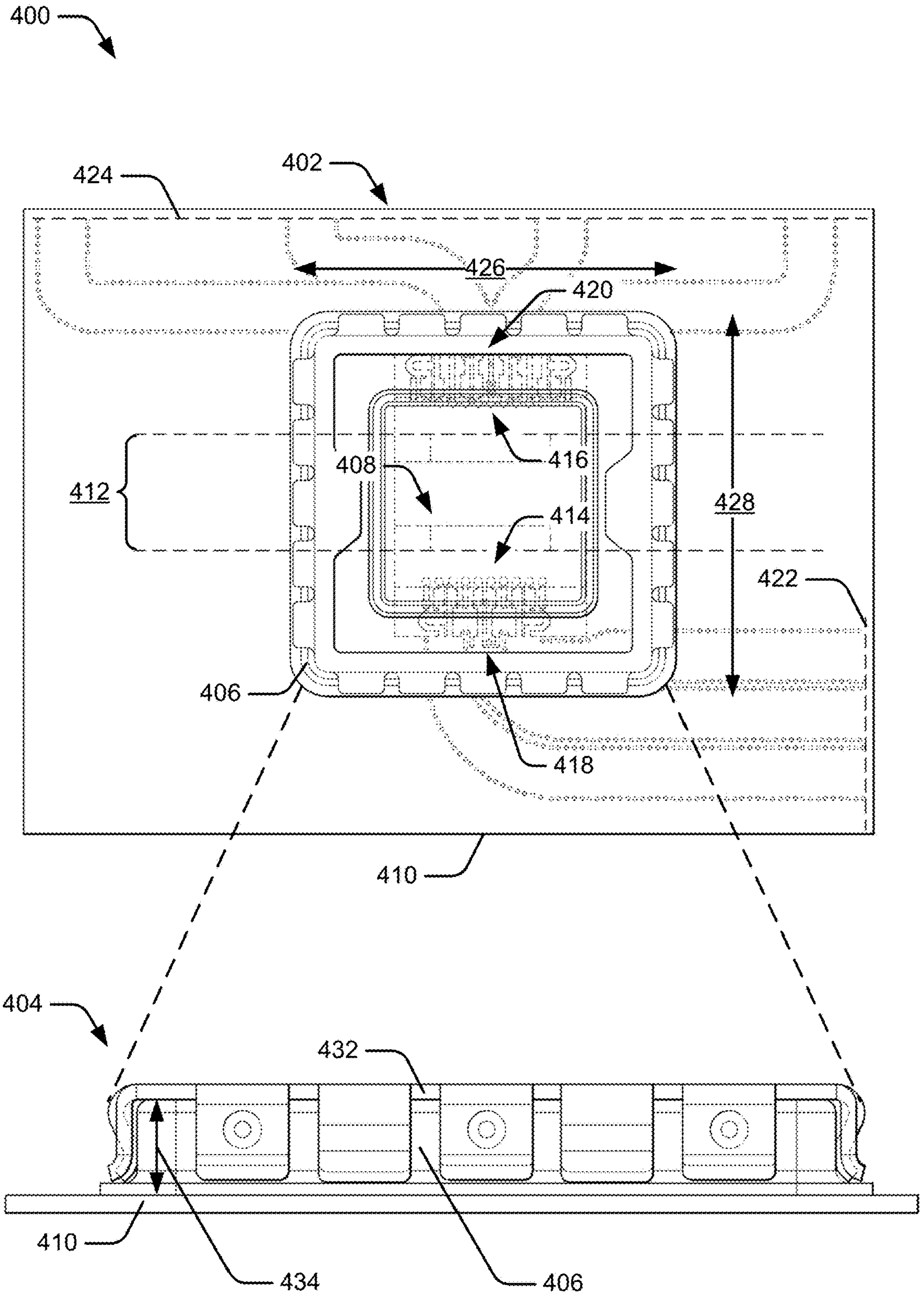
FIG. 4 illustrates an example system that includes one or more differential input transition structures, in accordance with techniques, apparatuses, and systems of this disclosure.

FIG. 4 illustrates an example system 400 that includes one or more differential input transition structures using aspects of high-isolation transition design for differential signal ports. FIG. 4 includes a topical view 402 of the system 400 and a side view 404 of the system 400. As shown in the topical view 402, the system 400 includes a shielding structure 406 that covers an MMIC 408 on a PCB 410. In some aspects, the system places a thermally conductive and electromagnetic absorbing material and/or radio frequency (RF) absorber (not shown) over the MMIC 408 such that the shielding structure 406 covers the MMIC 408 and the thermally conductive and electromagnetic absorbing material. Any suitable type of material may be used to form the shielding structure, such as any suitable metal (e.g., copper, aluminum, carbon steel, pre-tin plated steel, zinc, nickel, nickel silver). Similarly, any suitable material can be used for the thermally conductive and electromagnetic absorbing material, such as a dielectric foam absorber, polymer-based materials, magnetic absorbers, and so forth. Lines 412 provide an additional reference for the MMIC package port locations.

The shielding structure 406 also covers transmit differential signal ports 414, receive differential signal ports 416, transmit-side balun-with-delay and/or differential input transition structures 418, and receive-side balun-with-delay and/or differential input transition structures 420. In some aspects, the shielding structure 406 covers portions of the SIWs. To illustrate, the PCB 410 includes three transmit SIW, denoted by reference line 422, and four receive SIWs, denoted by reference line 424. Each transmit SIW connects to a respective structure of the transmit-side balun-with-delay and/or differential input transition structures 418 and an antenna with transmit capabilities. Similarly, each receive SIW connects to a respective structure of the receive-side balun-with-delay and/or differential input transition structures 420 and an antenna with receive capabilities. In aspects, the shielding structure 406 covers a portion of each receive SIW and transmit SIW (e.g., the portion that connects to the respective balun-with-delay and/or differential input transition structures). Thus, the shielding structure 406 covers the MMIC 408 and the various structures used to connect a single-ended signal to a differential signal. Alternatively or additionally, the shielding structure 406 covers thermal conductive and electromagnetic absorbing material as further described. In some aspects, the MMIC 408, the transmit differential signal ports 414, the receive differential signal ports 416, the transmit-side balun-with-delay and/or differential input transition structures 418, the receive-side balun-with-delay and/or differential input transition structures 420, the transmit SIWs, and the receive SIWs correspond to those described with reference to FIG. 3.

The shielding structure 406 illustrated in the example system 400 has a rectangular shape with a width 426 and a height 428. However, any other suitable geometric shape can be utilized. In one example, the width 426 generally has a length of 15.2 mm within a threshold value of error, and the height 428 generally has a length of 15.2 mm within the threshold value of error. In some aspects, the threshold value of error corresponds to a percentage of error, such as 0.1% error, 0.5% error, 1% error, 5% error, and so forth.

Side view 404 illustrates an expanded and rotated view of a portion of the system 400. The side view 404 includes the shielding structure 406, the PCB 410, and a metal lid 432. As further shown, the shielding structure 406 has a thickness 434. In one example, the thickness 434 generally has a length of 1.85 mm within a threshold value of error. In some aspects, the threshold value of error corresponds to a percentage of error, such as 0.1% error, 0.5% error, 1% error, 5% error, and so forth.

Two-layer, horizontal differential input transition structures (e.g., differential input transition structures) provide high-isolation between channels for differential signal-to-single-ended signals and mitigate RF leakage that degrades signal quality. The two-layer, horizontal differential input transition structures also accommodate PCB configurations that place an MMIC and antenna on a same side and mitigate unwanted RF power loss. Using two layers relative to multiple PCB layers (e.g., greater than two) also helps reduce production costs by reducing a number of layers included in the design. However, in other aspects, the differential input transition structure may be implemented using a single layer of a low-temperature co-fired ceramic (LTCC) material that feeds electromagnetic signals into other LTCC structures (e.g., an antenna, laminated waveguide). In some aspects, placing differential input transition structures next to other transition structures, such as balun-with-delay structures, reduces RF coupling by placing different radiation patterns next to one another. However, alternate implementations only use differential input transition structures.

ADDITIONAL EXAMPLES

In the following section, additional examples of a high-isolation transition design for differential signal ports are provided.

Example 1: A differential input transition structure comprising: a first layer made of a conductive metal and positioned at a bottom of the differential input transition structure; a substrate positioned above and adjacent to the first layer; and a second layer made of the conductive metal and positioned above and adjacent to the substrate, the second layer comprising: a first section formed to electrically connect a single-ended signal contact point to a first contact point of a differential signal port, the first section including a first stub based on an input impedance of the SIW and a second stub based on a differential input impedance associated with the differential signal port; and a second section separated from the first section, the second section formed to electrically connect to a second contact point of the differential signal port and electrically connected to the first layer through a via, the second section including a third stub associated with the differential input impedance and a pad that electrically connects the via to the second layer.

Example 2: The differential input transition structure as recited in example 1, wherein the second section of the second layer is disconnected and separated from the single-ended signal contact point.

Example 3: The differential input transition structure as recited in example 1, wherein the second stub of the first section and the third stub of the second section form a quarter-wave impedance transformer.

Example 4: The differential input transition structure as recited in example 3, wherein the quarter-wave impedance transformer is based on a waveform in a frequency range of 70 to 85 gigahertz (GHz).

Example 5: The differential input transition structure as recited in example 1, wherein the via that connects the second layer to the first layer, and the pad shaped to encompass the via are positioned at an entrance of a substrate integrated waveguide (SIW), the SIW being the single-ended signal contact point.

Example. 6: The differential input transition structure as recited in example 1, wherein the differential input impedance is based on a monolithic microwave integrated circuit (MMIC) transmitter or receiver port.

Example 7: The differential input transition structure as recited in example 1, wherein the first stub, the second stub, or the third stub has a size based on at least one of: an operating frequency of the differential signal port or the single-ended signal contact point; a combined thickness of the first layer, the substrate, and the second layer; or a material of the substrate.

Example 8: The differential input transition structure as recited in example 7, wherein the first stub has a rectangular shape with a width of 43 millimeters (mm) within a threshold value of error and a height of 43 mm within the threshold value of error.

Example 9: A system comprising: a monolithic microwave integrated circuit (MMIC) with one or more differential signal ports; one or more substrate integrated waveguides (SIWs); one or more balun-with-delay structures; and one or more differential input transition structures, each differential input transition comprising: a first layer made of a conductive metal and positioned at a bottom of the differential input transition structure; a substrate positioned above and adjacent to the first layer; and a second layer made of the conductive metal and positioned above and adjacent to the substrate, the second layer comprising: a first section that electrically connects a respective SIW of the one or more SIWs to a respective differential signal port of the one or more differential signal ports, the first section including a first stub based on an SIW input impedance of the respective SIW and a second stub based on a differential input impedance of the respective differential signal port; and a second section separated from the first section, the second section electrically connected to the respective differential signal port and electrically connected to the first layer through a via, the second section including a third stub associated with the differential input impedance of the respective differential signal port and including a pad shaped to encompass the via.

Example 10: The system as recited in example 9, wherein the system includes: a first balun-with-delay structure of the one or more balun-with-delay structures that connects to a first differential signal port of the one or more differential signal ports of the MMIC; and a first differential input transition structure of the one or more differential input transition structures that connects to a second differential signal port of the one or more differential signal ports of the MMIC, wherein the first differential signal port is located next to the second differential signal port, and wherein the first balun-with-delay structure is located next to the first differential input transition structure.

Example 11: The system as recited in example 10, wherein: the first differential signal port is a first transmit port of the MMIC, the second differential signal port is a second transmit port of the MMIC, the first balun-with-delay structure connects the first transmit port to a first SIW of the one or more SIWs, and the first differential signal port connects the second transmit port to a second SIW of the one or more SIWs.

Example 12: The system as recited in example 10, wherein: the first differential signal port is a first receive port of the MMIC, the second differential signal port is a second receive port of the MMIC, the first balun-with-delay structure connects the first receive port to a first SIW of the one or more SIWs, and the first differential signal port connects the second receive port to a second SIW of the one or more SIWs.

Example 13: The system as recited in example 12, wherein the system further comprises: a second differential input transition structure of the one or more differential input transition structures that connects a third differential signal port of the one or more differential signal ports of the MMIC to a third SIW of the one or more SIWs, the third differential signal port being a third receive port of the MMIC; wherein the second differential input transition structure is located next to the first differential input transition structure, and wherein the second differential input transition structure is flipped relative to the first differential input transition structure such that: the first section of the first differential input transition structure is located next to the first section of the second differential input transition structure; and the second section of the first differential input transition structure is located next to the first balun-with-delay structure.

Example 14: The system as recited in example 13, wherein the system includes: a second balun-with-delay structure of the one or more balun-with-delay structures that connects a fourth differential signal port of the one or more differential signal ports of the MMIC to a fourth SIW of the one or more SIWs, the fourth differential signal port being a fourth receive port of the MMIC, wherein the second balun-with-delay structure is located next to the second section of the second differential input transition structure.

Example 15: The system as recited in example 9, further comprising: a metal shield positioned over the MMIC, the one or more balun-with-delay structures, and the one or more differential input transition structures.

Example 16: The system as recited in example 15, wherein a size of the shield comprises: a width of 15.2 millimeters (mm) within a threshold value of error; and a length of 15.2 mm within the threshold value of error.

Example 17: The system as recited in example 9, wherein, for at least one differential input transition structure of the one or more differential input transition structures, the second stub of the first section and the third stub of the second section, in combination, form a quarter-wave impedance transformer.

Example 18: The system as recited in example 17, wherein the second stub of the first section and the third stub of the second section, in combination, form the quarter-wave impedance transformer based on a waveform in a frequency range of 70 to 85 gigahertz (GHz).

Example 19: The system as recited in example 9, wherein, for at least one differential input transition structure of the one or more differential input transition structures, the system positions the pad and the via of the second section at an entrance of at least one SIW of the one or more SIWs.

Example 20: The system as recited in example 9, wherein, for at least one differential input transition structure of the one or more differential input transition structures, the first stub included in the first section has a size comprising: a width of 0.42 millimeters (mm) within a threshold value of error; and a length of 0.43 mm within the threshold value of error.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A differential input transition structure comprising:

a first section formed to electrically connect a single-ended signal contact point to a first contact point of a differential signal port, the first section including a first stub that matches an input impedance of the single-ended signal contact point and a second stub that matches a differential input impedance associated with the differential signal port; and a second section separated from the first section, the second section formed to electrically connect to a second contact point of the differential signal port, the second section including a third stub that matches the differential input impedance, wherein the differential input transition structure is implemented on low-temperature co-fired ceramic (LTCC) material.

2. The differential input transition structure of claim 1, wherein:

the first stub has a size or shape that enables the first stub to match the input impedance of the single-ended signal contact point;

the second stub has a size or shape that enables the second stub to match the input impedance of the first contact point of the differential signal port; and the third stub has a size or shape that enables the third stub to match the input impedance of the second contact point of the differential signal port.

3. The differential input transition structure of claim 1, wherein the differential input transition structure is implemented on a single layer of the LTCC material.

4. The differential input transition structure of claim 1, wherein the second section is disconnected and separated from the single-ended signal contact point.

5. The differential input transition structure of claim 1, wherein the second stub of the first section and the third stub of the second section form a quarter-wave impedance transformer.

6. The differential input transition structure of claim 5, wherein the quarter-wave impedance transformer is based on a waveform in a frequency range of 70 to 85 gigahertz (GHz).

7. The differential input transition structure of claim 1, wherein:

the differential signal port is a monolithic microwave integrated circuit (MMIC) transmitter port; or the differential signal port is an MMIC receiver port.

8. The differential input transition structure of claim 7, wherein the first stub has a rectangular shape with a width of 0.42 millimeters (mm) within a threshold value of error and a height of 0.43 mm within the threshold value of error.

9. The differential input transition structure of claim 1, wherein the first stub, the second stub, or the third stub has a size based on an operating frequency of the differential signal port or the single-ended signal contact point.

10. A system comprising:

a monolithic microwave integrated circuit (MMIC) with one or more differential signal ports; and one or more differential input transition structures implemented on low-temperature co-fired ceramic (LTCC) material, each differential input transition structure comprising:

a first section formed to electrically connect a single-ended signal contact point to a first contact point of a respective differential signal port of the one or more differential signal ports, the first section including a first stub that matches an input impedance of the single-ended signal contact point and a second stub that matches a differential input impedance associated with the respective differential signal port; and a second section separated from the first section, the second section formed to electrically connect to a second contact point of the differential signal port, the second section including a third stub that matches the differential input impedance.

11. The system of claim 10, further comprising a thermally conductive and electromagnetic absorbing material placed over the MMIC.

12. The system of claim 11, further comprising a shielding structure covering the thermally conductive and electromagnetic absorbing material and the MMIC.

13. The system of claim 10, wherein the one or more differential input transition structures are implemented on a single layer of the LTCC material.

14. The system of claim 10, wherein a first differential input transition structure is arranged adjacent to a second differential input transition structure such that the first section of the first differential input transition structure is located next to the first section of the second differential input transition structure.

15. The system of claim 14 further comprising:

a first balun-with-delay structure located adjacent to the second section of the first differential input transition structure; and a second balun-with-delay structure located adjacent to the second section of the second differential input transition structure.

16. The system of claim 15, wherein:

the first balun-with-delay structure is configured to connect to a first differential signal port of the MMIC;

the first differential input transition structure is configured to connect to a second differential signal port of the MMIC;

the second differential input transition structure is configured to connect to a third differential signal port of the MMIC; and the second balun-with-delay structure is configured to connect to a fourth differential signal port of the MMIC.

17. The system of claim 16, wherein:

the first differential signal port, the second differential signal port, the third differential signal port, and the fourth differential signal port are receive ports of the MMIC.

18. The system of claim 16 further comprising:

a third balun-with-delay structure configured to connect to a fifth differential port of the MMIC;

a third differential input transition structure configured to connect to a sixth differential port of the MMIC, the first section of the third differential input transition structure being located adjacent to the third balun-with-delay structure; and a fourth balun-with-delay structure configured to connect to a seventh differential port of the MMIC, the fourth balun-with-delay structure being located adjacent to the second section of the third differential input structure.

19. The system of claim 18, wherein the fifth differential port, the sixth differential port, and the seventh differential port are transmit ports of the MMIC.

20. The system of claim 18, wherein the first balun-with-delay structure, the second balun-with-delay structure, the third balun-with-delay structure, and the fourth balun-with-delay structure each comprise:

a third section including a delay line configured to introduce a 180° phase shift in a signal carried by the first section; and a fourth section including a stub.

* * * * *